US010773810B2

(12) United States Patent
Raimarckers

(10) Patent No.: US 10,773,810 B2
(45) Date of Patent: Sep. 15, 2020

(54) TURBOFAN ENGINE DE-ICING COMPRESSOR AND DE-ICING PROCESS

(71) Applicant: Safran Aero Boosters SA, Herstal (Milmort) (BE)

(72) Inventor: Nicolas Raimarckers, Tourinne (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 290 days.

(21) Appl. No.: 15/979,060

(22) Filed: May 14, 2018

(65) Prior Publication Data

US 2018/0346134 A1  Dec. 6, 2018

(30) Foreign Application Priority Data

May 31, 2017  (BE) .................... 2017/5388

(51) Int. Cl.
*B64D 15/16* (2006.01)
*F01D 25/02* (2006.01)
*F04D 29/02* (2006.01)
*F04D 29/54* (2006.01)
*B64D 33/02* (2006.01)
*F02C 7/047* (2006.01)

(52) U.S. Cl.
CPC .......... *B64D 15/166* (2013.01); *F01D 25/02* (2013.01); *F04D 29/023* (2013.01); *F04D 29/542* (2013.01); *B64D 2033/0233* (2013.01); *F02C 7/047* (2013.01); *F05D 2240/121* (2013.01); *F05D 2300/43* (2013.01); *F05D 2300/501* (2013.01)

(58) Field of Classification Search
CPC ...... B64D 15/00; B64D 15/16; B64D 15/166; B64D 2033/0233; F01D 25/02; F04D 29/023; F04D 29/542

USPC .......................... 244/134 A, 134 R
See application file for complete search history.

(56) References Cited

U.S. PATENT DOCUMENTS 2,547,934 A * 4/1951 Gill ..................... F02C 7/047
                                              415/232
3,690,601 A * 9/1972 Roemke ............... B64D 15/166
                                              244/134 A (Continued)

FOREIGN PATENT DOCUMENTS

EP  0098182 A1  1/1984
EP  0238542 A2  9/1987

(Continued)

OTHER PUBLICATIONS

European Search Report from corresponding BE2017/05388 dated Feb. 5, 2018.

*Primary Examiner* — Richard R. Green
*Assistant Examiner* — Brady W Frazier
(74) *Attorney, Agent, or Firm* — Sandberg Phoenix & von Gontard, P.C.

(57) ABSTRACT

An aircraft turbojet engine low-pressure compressor or booster, comprising an inlet structure de-iced by a pressurized hot fluid circulation coming from the high-pressure compressor. The de-icing structure comprises a deformable membrane through the thickness of which the pressurized fluid circulation passes. When there is a build-up of ice on the membrane, the pressurized fluid circulation is blocked, resulting in its pressure deforming the membrane in such a manner as to crack the build-up of ice.

15 Claims, 5 Drawing Sheets

(56) References Cited

U.S. PATENT DOCUMENTS

| | | | | |
|---|---|---|---|---|
| 4,747,575 A * | 5/1988 | Putt | ............. | B64D 15/166 |
| | | | | 137/624.14 |
| 4,961,549 A * | 10/1990 | LaRue | ............. | B64D 15/166 |
| | | | | 244/134 A |
| 5,112,011 A * | 5/1992 | Weisend, Jr. | ............. | B64D 15/166 |
| | | | | 244/134 A |
| 5,337,978 A * | 8/1994 | Fahrner | ............. | B64D 15/166 |
| | | | | 244/134 A |
| 6,283,411 B1 * | 9/2001 | Giamati | ............. | B64D 15/12 |
| | | | | 244/134 A |
| 6,736,611 B2 * | 5/2004 | Putt | ............. | B64D 15/166 |
| | | | | 244/134 A |
| 2003/0035719 A1 * | 2/2003 | Wadia | ............. | F02C 7/047 |
| | | | | 415/145 |
| 2003/0122037 A1 * | 7/2003 | Hyde | ............. | B64D 15/166 |
| | | | | 244/134 A |
| 2012/0255274 A1 * | 10/2012 | Hummel | ............. | B64D 15/04 |
| | | | | 60/39.093 |
| 2013/0277501 A1 * | 10/2013 | Delrieu | ............. | B64D 15/16 |
| | | | | 244/134 A |
| 2015/0129720 A1 * | 5/2015 | Strobl | ............. | B64D 15/16 |
| | | | | 244/134 D |

FOREIGN PATENT DOCUMENTS

| | | | |
|---|---|---|---|
| EP | 3130765 | A1 | 2/2017 |
| FR | 2962489 | A1 | 1/2012 |

\* cited by examiner

TURBOFAN ENGINE DE-ICING COMPRESSOR AND DE-ICING PROCESS

CROSS-REFERENCE TO RELATED APPLICATIONS

This application claims the benefit, under 35 U.S.C. § 119, of BE 2017/5388 filed May 31, 2017, the disclosure of which is incorporated herein by reference in its entirety.

FIELD

The invention relates to the de-icing of a turbofan engine compressor with the help of a pressurized de-icing fluid. The invention likewise relates to an axial turbofan engine, in particular an aeroplane turbojet engine or an aircraft turboprop. The invention moreover comprises a compressor de-icing process.

BACKGROUND

Low-pressure compressor inlets have been equipped with de-icing systems involving the injection of hot air for a number of years. These systems include channels passing through the splitter and notches guiding the de-icing gas towards vanes screening the inlet of the compressor.

Document EP3130765 A1 discloses a dual-flow turbojet engine equipped with a low-pressure compressor, the inlet whereof is delimited by a de-icing splitter. Said splitter comprises an external annular wall, an internal annular wall with a circular upstream edge attached to the external wall. The internal wall is an external shroud supporting the inlet vanes and is configured to guide the primary flow following separation by the splitter. The upstream edge of the internal wall has notches which pass radially through the internal wall to allow de-icing fluid to circulate through the internal wall. This de-icing fluid is both hot and pressurized; it is taken from the high-pressure compressor. In spite of skilful calibration of the notches, the efficiency remains open to improvement.

SUMMARY

The problem addressed by the present disclosure is that of solving at least one of the problems posed by the prior art. To be more precise, the problem addressed by the invention is that of improving the de-icing capacity of the compressor. The invention likewise aims to propose a simple, resistant, lightweight, economical, reliable solution that is easy to produce, convenient to maintain, easy to inspect and improves performance.

The object of the invention is an axial turbine engine compressor, in particular an aircraft turbojet engine low-pressure compressor, the compressor comprising a de-icing structure capable of being de-iced by a pressurized fluid circulation, being notable in that the de-icing structure comprises: at least one deformable membrane capable of being passed through according to its thickness, by the pressurized fluid circulation, the de-icing structure being configured in such a manner that a build-up of ice on the deformable membrane blocks or reduces the pressurized fluid circulation, and in that in the event of a blockage or reduction in the circulation, the pressure of the pressurized fluid deforms the deformable membrane in such a manner as to fracture the build-up of ice.

According to various advantageous methods of the invention, the compressor can comprise one or a plurality of the following characteristics, taken in isolation or according to all the possible technical combinations:

The membrane comprises an escape orifice for the pressurized fluid, the escape being configured to be plugged by the build-up of ice.

The deformable membrane comprises at least one flow separation line, the membrane being capable of being passed through by the pressurized fluid at the separation line.

The de-icing structure comprises a splitter with a circular separation edge formed by the separation line.

The de-icing structure comprises a stator vane with a leading edge formed by the separation line.

The vane comprises a lower surface and an upper surface extending from the leading edge, the deformable membrane forming, at least in part, the upper surface and/or the lower surface.

The de-icing structure comprises at least two annular rows of stator vanes, an upstream row and a downstream row, the at least one membrane being disposed on one of the vanes of the downstream row.

The membrane comprises a neoprene material permeable to the pressurized fluid.

The membrane comprises a metal material, in particular a metal sheet.

The structure comprises at least one body with an external surface covered by the deformable membrane, in the absence of ice the deformable membrane is configured to be pressed against the external surface and in the presence of ice the deformable membrane is configured to be moved away from the external surface thanks to the pressurized fluid.

The body comprises a zone of reduced thickness receiving the deformable membrane.

The external surface comprises at least one channel extending with respect to the deformable membrane and intended to be passed through by the pressurized fluid.

The body comprises a shoulder along which the deformable membrane is mounted in a leak-proof manner.

The deformable membrane is capable of moving between a first position occupied in the absence of ice and a second position occupied in the presence of ice; because the pressurized fluid pressure is capable of moving the membrane from the first position towards the second position, acting against a dynamic pressure of a fluid in the turbojet engine and/or overcoming the mechanical resistance of the build-up of ice.

The separation line crosses the orifice.

The channel has one end on the opposite side of the orifice and one end on the side of the orifice which is spaced apart from the orifice.

Another object of the invention is a turbofan engine with a de-icing inlet which is capable of being de-iced by a pressurized gas, notable in that the inlet comprises a membrane which is permeable to the pressurized gas and can be moved between a first position and a second position, when the membrane is in the first position and covered with ice its permeability to pressurized gas drops, with the result that the pressure of the gas displaces the membrane towards the second position in order to detach the ice from it.

Likewise, an object of the invention is a turbofan engine, in particular an aircraft turbojet engine, comprising a compressor which is notable in that the compressor conforms to the invention.

According to various advantageous embodiments of the invention, the turbofan engine comprises a device for pressurizing the pressurized fluid to a pressure greater than the outlet pressure of the compressor.

According to various advantageous embodiments of the invention, the turbofan engine comprises a module for heating the pressurized fluid to a temperature in excess of the outlet temperature of the compressor.

According to various advantageous embodiments of the invention, the turbofan engine moreover comprises a high-pressure compressor, the pressurized fluid coming from the high-pressure compressor, possibly from the upstream portion of the high-pressure compressor.

The invention likewise relates to a de-icing process of a turbofan engine compressor, in particular a low-pressure compressor, the process comprising the stages: (b) icing of a surface in contact with a flow from the compressor; (d) detachment of ice from the surface by a pressurized gas; notable in that the surface is formed by a membrane which is permeable to the pressurized gas and movable between a first configuration and a second configuration, during the icing stage (b) the permeability of the membrane drops with the result that the pressure of the pressurized fluid pushes the membrane into the second configuration, allowing the ice detachment stage (d) to be carried out, the surface possibly forms a de-icing structure and the compressor is possibly in accordance with the invention.

According to various advantageous embodiments of the invention, the pressurized fluid is supplied to the compressor in a discontinuous manner.

According to various advantageous embodiments of the invention, the process is an iterative process.

As a general rule, the advantageous variants of each object of the invention are likewise applicable to the other objects of the invention. Each object of the invention can be combined with other objects and the objects of the invention can likewise be combined with embodiments of the description which can, in turn, be combined with one another according to all the technical combinations possible, unless explicitly stated otherwise.

The invention allows combined de-icing of the compressor. Indeed, the effect of the pressure of the gas is combined with the effect of its increasing temperature, resulting in greater effectiveness. A mechanical effect is added to the evaporation of the parasitic ice or frost. Two properties of the fluid are used. It is possible to envisage the use of a third property when the chemical nature of the fluid allows de-icing.

Moreover, the invention allows there to be an intermittent supply of de-icing fluid. This method of supply allows the presence of ice to be detected with the help of a circulation test. The pressure can be increased significantly when the presence of ice is detected, due to a blockage of the membrane.

DRAWINGS

DETAILED DESCRIPTION

In the following description, the terms "internal" and "external" refer to a positioning in respect of the rotational axis of an axial turbofan engine. The axial direction corresponds to the direction along the rotational axis of the turbofan engine. The radial direction is perpendicular to the rotational axis. Upstream and downstream refer to the main flow direction of the flow in the turbofan engine.

Figure 1:
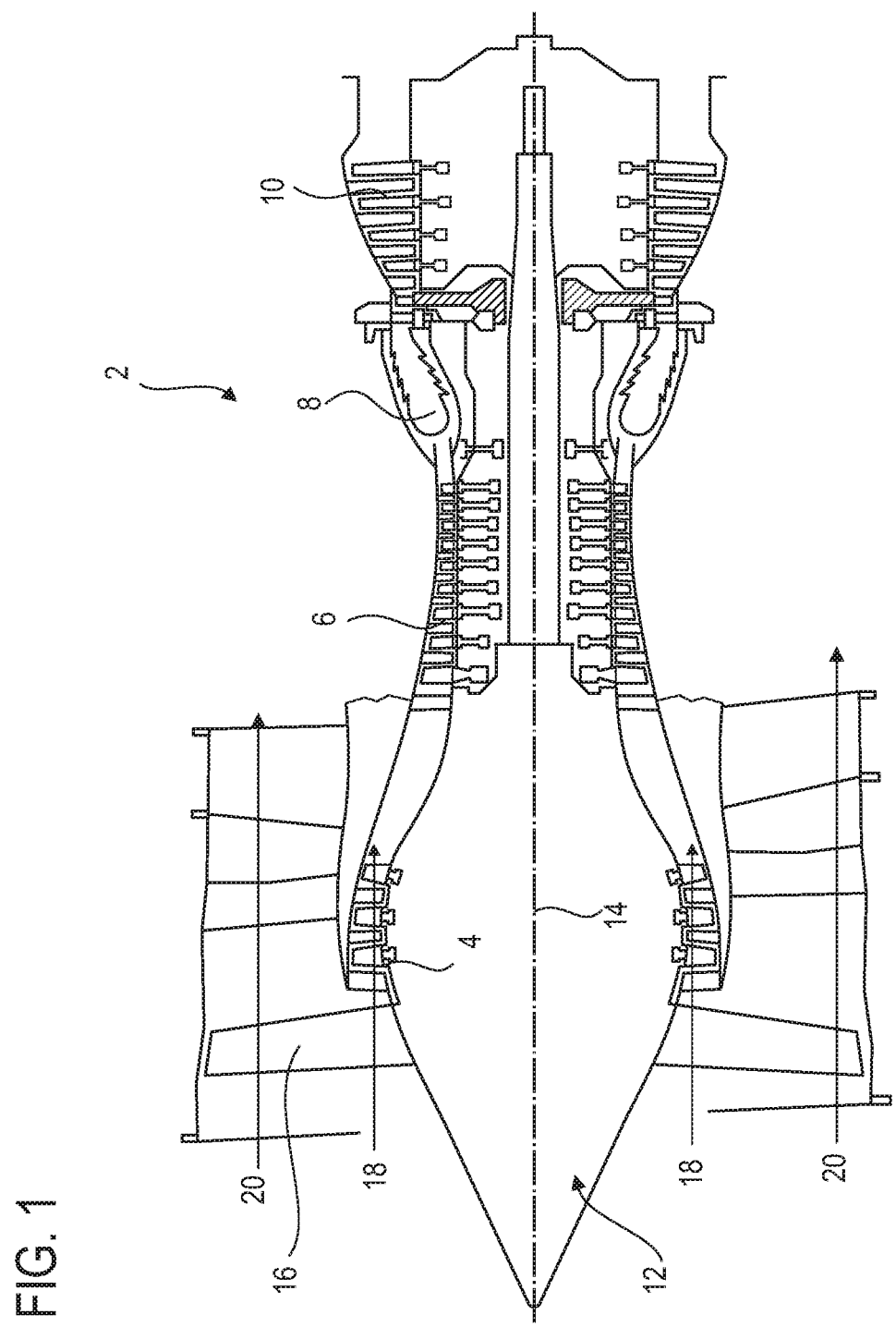
FIG. 1 represents an axial turbofan engine according to various embodiments of the invention.

FIG. 1 is a simplified representation of an axial turbofan engine. In this particular case it is a dual-flow turbojet engine. The turbojet engine 2 comprises a first compression level, the aforementioned low-pressure compressor 4, a second compression level, the aforementioned high-pressure compressor 6, a combustion chamber 8 and one or a plurality of turbine levels 10. During operation, the mechanical power of the turbine 10 transmitted via the central shaft to the rotor 12 sets the two compressors 4 and 6 in motion. The compressors comprise a plurality of rows of rotor vanes associated with rows of stator vanes. The rotation of the rotor about its rotational axis 14 thereby allows an air output to be generated and the air output to be progressively compressed up to the inlet of the combustion chamber 8.

An inlet fan commonly referred to as a fan or blower 16 is coupled to the rotor 12 and generates an air flow which is divided into a primary flow 18 which passes through the different levels referred to above of the turbofan engine and a secondary flow 20 which passes through an annular conduit (partially represented) along the engine and then rejoins the primary flow at the turbine outlet. The fan can be of the unducted type, for example having a double counter-rotational rotor, possibly downstream.

The secondary flow can be accelerated in such a manner as to generate a thrust reaction necessary for a plane to fly. The primary 18 and secondary 20 flows are coaxial annular flows fitted one inside the other. They are channelled by the casing of the turbofan engine and/or the shrouds. To this end, the casing has cylindrical walls which can be internal and external.

Figure 2:
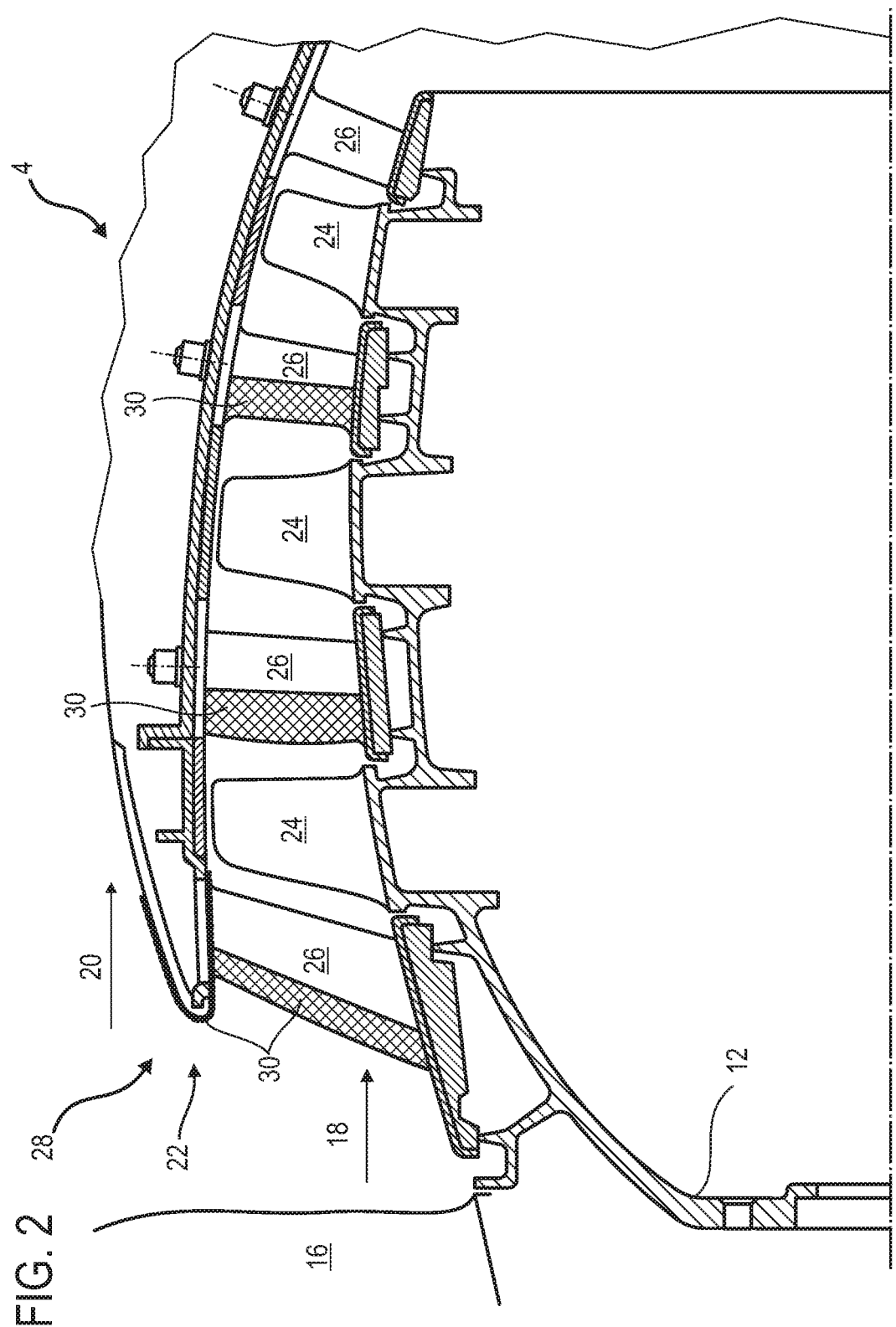
FIG. 2 is a diagram of a turbofan engine compressor according to various embodiments of the invention.

FIG. 2 is a sectional view of a compressor of an axial turbofan engine, such as that shown in FIG. 1. The compressor can be a low-pressure compressor 4. A portion of the fan 16 and the splitter 22 of the primary 18 and secondary 20 flows can be seen there. The rotor 12 comprises a plurality of rows of rotor vanes 24, in this case three. It can be an integral drum with vanes or comprise vanes with a dovetail fixing.

The low-pressure compressor 4 comprises a plurality of guide vane assemblies, in this case four, each of which contains a row of stator vanes 26. The guide vane assemblies are associated with the fan 16 or with a row of rotor vanes to guide the air flow, in such a manner as to convert the flow speed into pressure, particularly static pressure.

The stator vanes 26 extend substantially radially from an external casing and can be fixed there and immobilized with the help of shafts. Some of the vanes can have variable pitches. The casing can be formed by a plurality of rings or half shells.

In order to prevent ice both from forming and building up, the compressor has a de-icing structure 28. This de-icing structure 28 comprises at least one deformable membrane 30, possibly a plurality of deformable membranes 30. The membrane or membranes 30 can be disposed on the splitter and/or on the stator vanes 26 of the compressor 4. The vanes in question can be those upstream of the compressor 4, in other words those facing the fan 16. The vanes 26 of the downstream rows can likewise be equipped with membranes 30. Certain membranes 30 can be applied to the shrouds and the casings of the turbofan engine. The membranes 30 can be disposed half upstream of the vanes 26.

Figure 3:
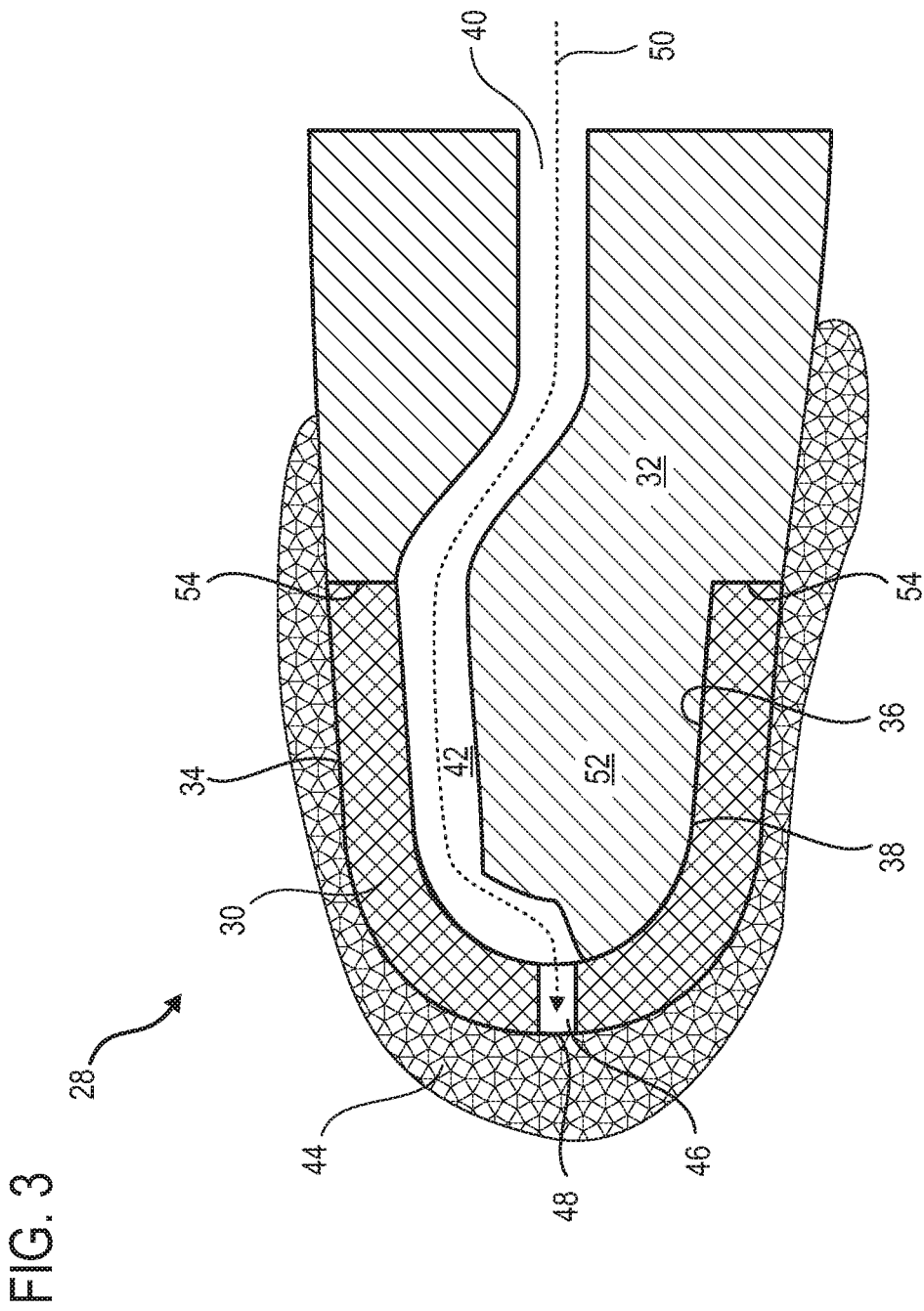
FIG. 3 illustrates a portion of the de-icing structure in a non-operational position according to various embodiments of the invention.

FIG. 3 depicts a portion of the de-icing structure 28 such as the one in FIG. 2. The deformable membrane 30 is in a first position in this case, for example a retracted and/or non-operational position.

The structure 28 comprises a body 32, possibly a substantially full body 32. The deformable membrane 30 partially covers the body 32. The external surface 34 of the membrane 30 can form that of the structure 28. In the present position, the internal surface 36 of the membrane 30 is pressed against the external surface 38 of the body 32 which is placed opposite, possibly on substantially all the internal surface 36 of the membrane 30. The internal surface 36 moulds the external surface 38 of the body to its interface; possibly over the majority of its interface or its entire interface.

The body 32 can comprise at least one passage 40, possibly a plurality of passages 40, distributed along and/or on the surface of the membrane 30. The, or at least one, or each passage 40 can comprise a channel 42, particularly formed on the external surface 38 of the body 32. Each channel 42 extends on the body/membrane interface. It can be covered with the membrane 30. Each passage 40 and, where appropriate, each channel 42 guides the pressurized de-icing fluid 50 used to prevent the build-up and/or appearance of ice 44.

Hence, the pressurized fluid 50 is channelled from its source to the external surface 34 of the membrane 30, and therefore to the external surface of the de-icing structure 28. By covering the sensitive zones of the structure with the help of membranes 30 and guaranteeing a circulation of de-icing fluid 50, it is possible to reduce or to suppress the ice which appears or tends to accumulate in a layer of ice 44 of variable thickness.

The membrane 30 can comprise at least one orifice 46. A plurality of orifices 46 can be distributed over the internal surface 36 and/or on the exterior 34 of the membrane 30. At least one or a plurality of or each orifice 46 can communicate with the, or one of the, passages 40, and possibly via the, or one of the, channels 42.

Thanks to each orifice 46, the pressurized fluid 50 can pass through the membrane 30 and emerge from the body 32. At least one, or the, orifice 46 can be placed on a separation line 48 which divides a flow encountered by the de-icing structure 28 into at least two flows. An upstream flow is divided into two downstream flows.

The membrane can be generally regarded as porous. Its porosity can result from the presence of orifices 46 and/or from its intrinsic structure. It can be micro-perforated. It can comprise conduits with a width of no more than: 500 μm or 100 μm or 10 μm. The membrane 30 can be metal and/or comprise neoprene. The neoprene material can be permeable to gas and, in particular, to the de-icing fluid, but impermeable to water. It can be a sheet with a generally constant thickness. The thickness can be lower than or equal to 0.10 mm.

The body 32 can be a body with a stator vane such as one of those represented in FIG. 2. In this case, the separation line 48 can be the leading edge of the vane. The external surface 34 of the structure can then form the inner surface and/or the outer surface of the vane. This means that the membrane 30 can be on the aspiration side or on the expulsion side of the vane or it can be on both sides.

The body 32 can likewise be the body of the splitter in the compressor inlet, such as that suggested in relation to FIG. 2. In this case, the separation line 48 can form the circular separation edge upstream of the splitter. The external surface 34 of the structure can then split and delimit the primary flow and/or the secondary flow of the turbofan engine.

In the event of significant icing 44 on the external surface 34, circulation of the pressurized fluid 50 is hindered. Specifically, the orifices 46 can become blocked and/or the flow across the micro-perforated material can be reduced and even stopped. The general porosity of the membrane 30 is reduced.

The body 32 can comprise a zone of reduced thickness 52. This zone 52 allows the thickness of the membrane 30 to be integrated there. The zone 52 can be delimited by at least one or two shoulders 54. Each shoulder 54 delimits the zone 52 and/or underlines the difference in thickness. The membrane 30 can be attached in a leak-proof manner to the shoulders 54 so that the pressurized fluid is contained there.

Figure 4:
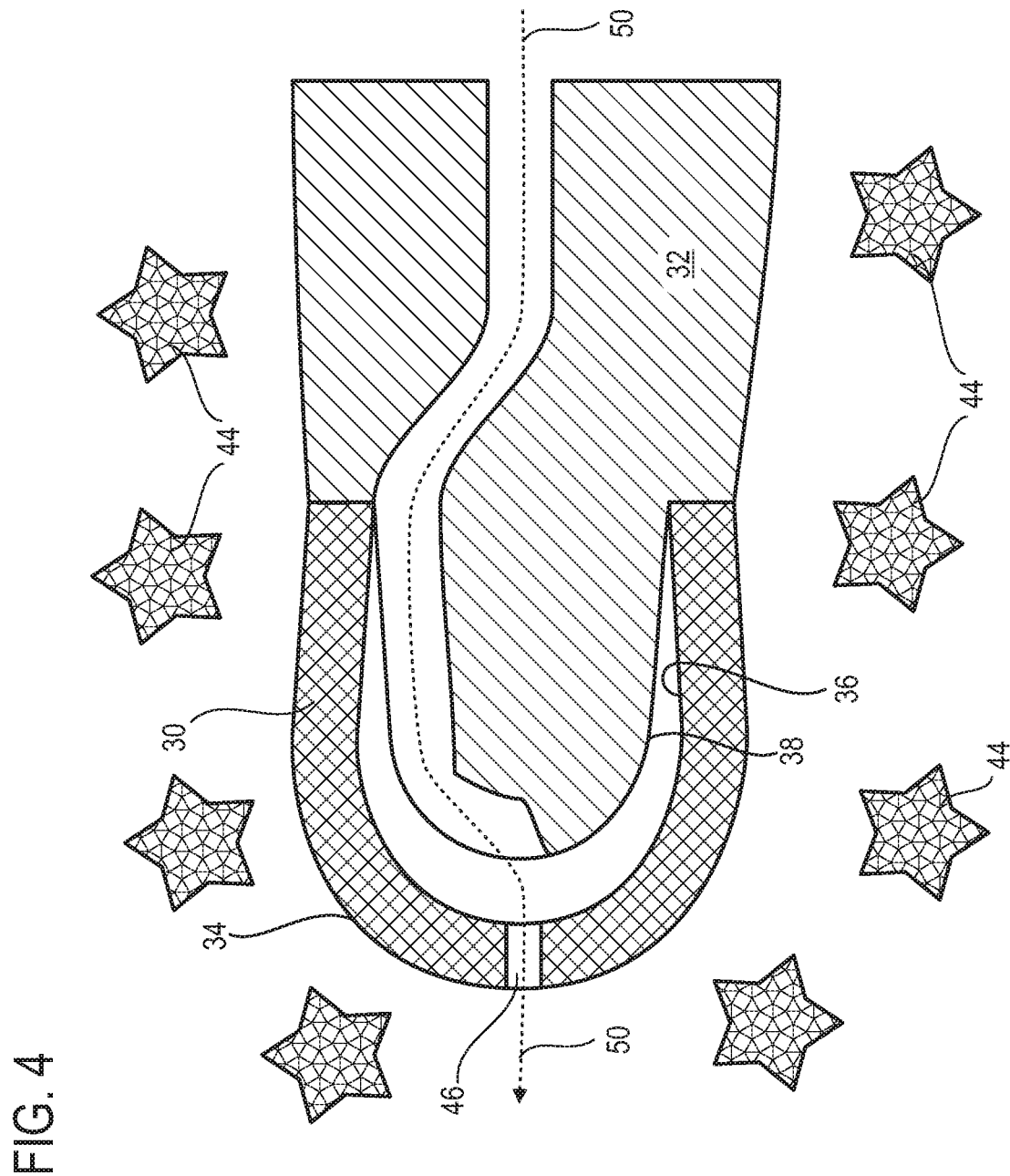
FIG. 4 illustrates the portion of the de-icing structure in a de-icing position according to various embodiments of the invention.

FIG. 4 depicts the de-icing structure 28 in FIG. 3 in a second position, also referred to as a deployed position or also a de-icing position.

Due to the reduction in permeability of the membrane 30 and the possible fluid blockage 50, the pressure of the fluid exerts a mechanical de-icing force. This force, or the mechanical result, tends to push the membrane 30 from the inside. The membrane 30 is moved from the first position, likewise referred to as the first configuration, to the second position, likewise referred to as the second configuration. The fluid pressure, and therefore the de-icing force, deforms the membrane 30 by opposing the dynamic pressure of the fluid entering the turbofan engine. Moreover, the mechanical resistance of the layer of ice 44 is overcome. The ice 44 cracks and becomes detached from the external surface 34. Due to the possible enlargement of the membrane, the shear force at the interface detaches the ice 44 from the external surface 34.

During the course of this phenomenon, the internal surface 36 of the membrane 30 is removed from the external surface 38 of the body 32. The membrane swells to some extent. The space that it delimits together with the body 32 is filled with pressurized fluid 50. This filling is carried out until the orifice 46 unblocks and/or the external surface 34 is unclogged completely or sufficiently to allow circulation through the membrane 30. When the membrane 30 empties, it starts to press against the external surface 38 of the body once again.

Figure 5:
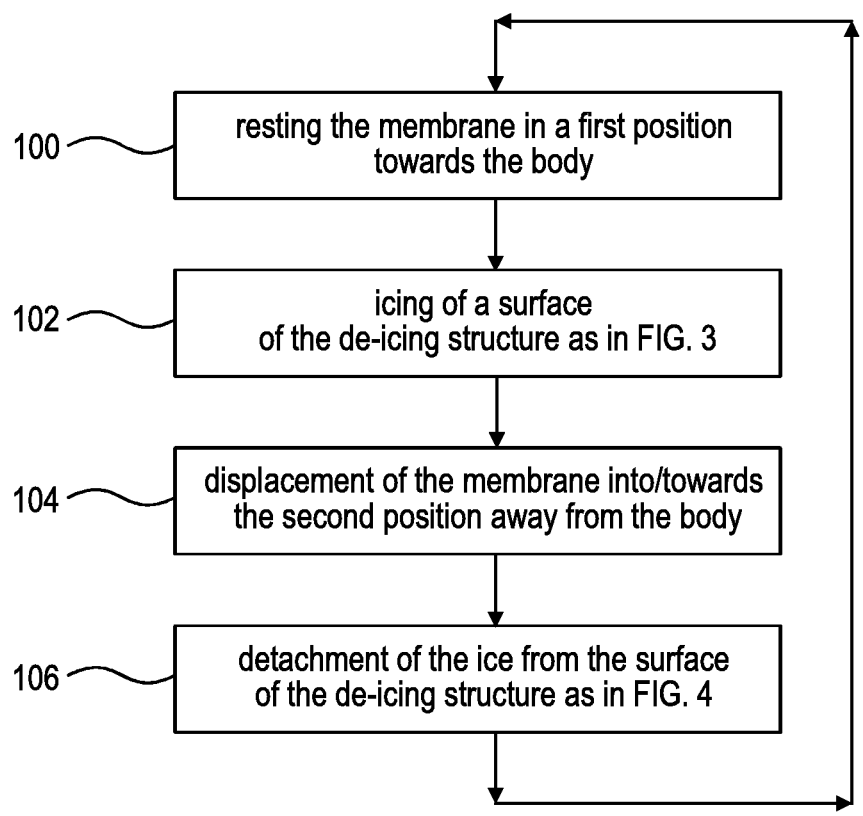
FIG. 5 is a diagram of the compressor de-icing process according to various embodiments of the invention.

FIG. 5 shows a diagram of the compressor de-icing process. The compressor can be the one represented in relation to FIGS. 1 to 4.

The process can comprise the following steps, possible carried out in the order shown below:

(a) resting 100 of the membrane in a first position towards the body;

(b) icing 102 of a surface of the de-icing structure, as depicted in FIG. 3;

(c) displacement 104 of the membrane into or towards the second position moving away from the body, at least in some areas;

(d) detachment 106 of the ice from the surface of the de-icing structure, as represented in FIG. 4.

The stages (a) rest 100 and (b) icing 102 can be carried out one after the other or simultaneously. Likewise, the stages (c) displacement 104 and (d) detachment 106 can be carried out one after the other or simultaneously.

Following stage (d) detachment 106, the process can return to stage (a) rest 100. The membrane can resume its retracted position. It can move closer to the body once again and mould it.

The supply of pressurized fluid can be intermittent. It can be carried out periodically in a repeated manner. The supply can comprise test or detection supplies, for example at a lower pressure. In effect, when fluid is injected but does not flow, a situation where ice is present can be detected. In fact, the consequence of an accumulation of ice is to prevent the fluid from flowing freely. Another higher-pressure flow can be injected in response to this. The function of this is to break up the ice and release it from the affected surface.

What is claimed is:

1. An axial turbine engine compressor comprising:
    a de-icing structure capable of being de-iced by a pressurized fluid circulation, wherein the de-icing structure comprises:
    at least one deformable membrane having a thickness through which the pressurized fluid circulation can pass, wherein the de-icing structure is configured in such a manner that a build-up of ice on the at least one deformable membrane blocks or reduces the pressurized fluid circulation, and wherein in the event of a blockage or reduction in the circulation, the pressure of the pressurized fluid deforms the at least one deformable membrane in such a manner as to fracture the build-up of ice, and
    at least one body with an external surface covered by the at least one deformable membrane, such that in the absence of ice the at least one deformable membrane is configured to be pressed against the external surface and in the presence of ice the at least one deformable membrane is configured to be moved away from the external surface via the pressurized fluid.

2. The compressor according to claim 1, wherein the deformable membrane comprises an escape orifice for the pressurized fluid, the orifice being configured to be plugged by the build-up of ice.

3. The compressor according to claim 1, wherein the de-icing structure comprises at least two annular rows of stator vanes, an upstream row and a downstream row, the at least one deformable membrane being disposed on one of the vanes of the downstream row.

4. The compressor according to claim 1, wherein deformable membrane comprises a neoprene material permeable to the pressurized fluid.

5. The compressor according to claim 1, wherein the deformable membrane comprises a metal sheet.

6. The compressor according to claim 1, wherein the body comprises a zone of reduced thickness receiving the deformable membrane.

7. The compressor according to claim 1, wherein the external surface comprises at least one channel extending with respect to the deformable membrane and intended to be passed through by the pressurized fluid.

8. The compressor according to claim 1, wherein the body comprises a shoulder along which the deformable membrane is mounted in a leak-proof manner.

9. The compressor according to claim 1, wherein the deformable membrane is capable of moving between a first position occupied in the absence of ice and a second position occupied in the presence of ice as a result of the pressurized fluid pressure being capable of at least one of moving the deformable membrane from the first position towards the second position, acting against a dynamic pressure of a fluid in the turbojet engine and overcoming the mechanical resistance of the build-up of ice.

10. The compressor of claim 1, wherein the at least one deformable membrane further comprises:
    at least one flow separation line, the at least one deformable membrane being capable of being passed through by the pressurized fluid at the separation line.

11. The compressor according to claim 10, wherein the de-icing structure comprises a splitter with a circular separation edge formed by the separation line.

12. The compressor according to claim 10, wherein the de-icing structure comprises a vane with a leading edge formed by the separation line.

13. The compressor according to claim 12, wherein the vane comprises a lower surface and an upper surface extending from the leading edge, the deformable membrane forming, at least in part at least one of the upper surface and the lower surface.

14. A de-icing process of an axial low-pressure turbofan engine compressor, the process comprising the stages:
    icing of a surface of the axial low-pressure turbofan engine compressor, the surface being in contact with a flow; and
    detachment of ice from the surface by a pressurized gas, wherein the surface is formed by a membrane that is permeable to the pressurized gas and deformable between a first configuration and a second configuration, wherein during the icing stage the permeability of the membrane drops with the result that the pressure of the pressurized fluid pushes the membrane into the second configuration, allowing the ice detachment stage to be carried out,
    the surface forming, together with at least one body, a de-icing structure, wherein the at least one body is provided with an external surface covered by the deformable membrane, and wherein in the absence of ice the deformable membrane is configured to be pressed against the external surface and in the presence of ice the deformable membrane is configured to be moved away from the external surface via the pressurized fluid.

15. The process according to claim 14, wherein the pressurized fluid is supplied to the compressor in a discontinuous manner.

* * * * *